Nov. 6, 1956 W. H. WOOD 2,769,282
GRINDING MACHINE-TAPER CONTROL
Filed June 20, 1955
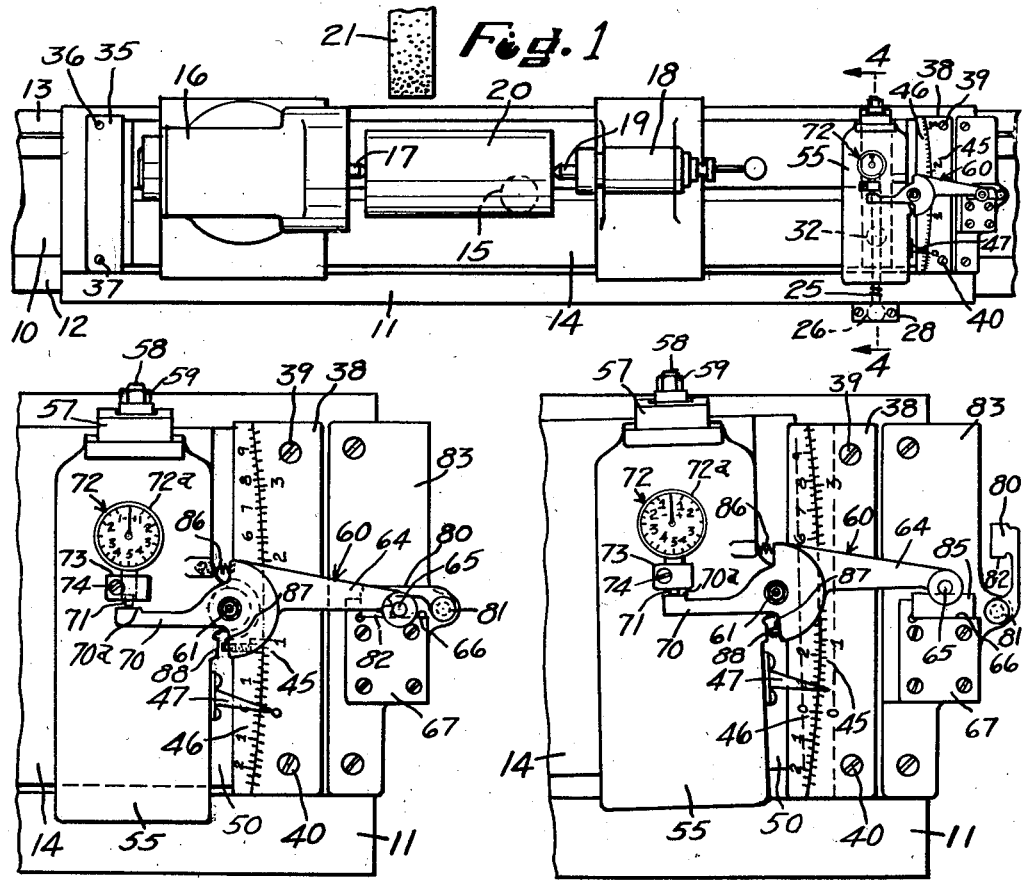
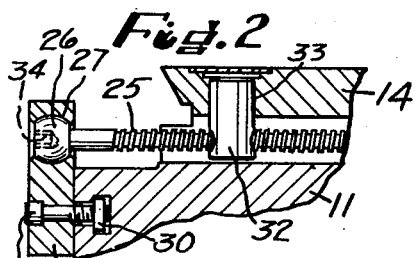
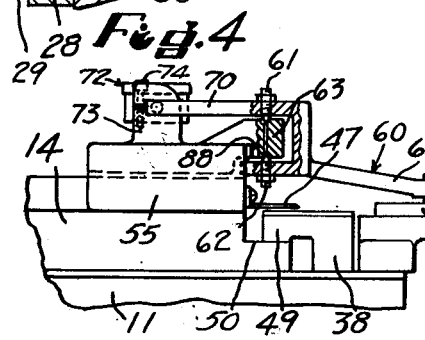
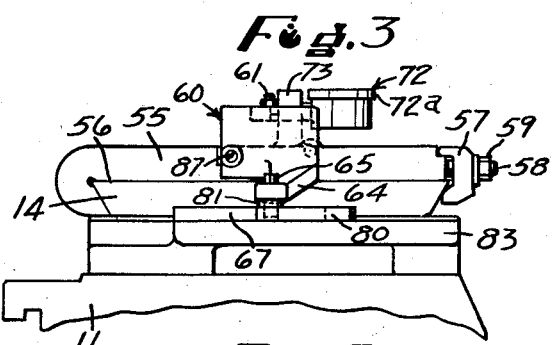
INVENTOR.
WALLACE H. WOOD
BY
Harold W. Eaton
ATTORNEY United States Patent Office 2,769,282
Patented Nov. 6, 1956

2,769,282
GRINDING MACHINE-TAPER CONTROL

Wallace H. Wood, Worcester, Mass., assignor to Norton Company, Worcester, Mass., a corporation of Massachusetts Application June 20, 1955, Serial No. 516,681

7 Claims. (Cl. 51—95)

The invention relates to machine tools, and more particularly to a precision swivelling apparatus for angularly adjusting the position of a machine tool part, such as, for example the swivel table of a cylindrical grinding machine.

It is one object of the invention to provide a simple and thoroughly practical swivel adjusting mechanism for a machine tool part to facilitate producing accurate tapers. Another object is to provide a precision mechanism for swivelling the swivel table of a cylindrical grinding machine to facilitate grinding predetermined tapers on a work piece. Another object is to provide a sine bar type swivel adjusting mechanism. A further object is to provide a precision swivel adjusting mechanism to facilitate readily adjusting a swivel table to facilitate forming a precision taper, such as a predetermined taper on diameter per foot or a predetermined taper in degrees on a side. A further object is to provide a swivelling mechanism which is precisely controlled by a precision gaging mechanism. Other objects will be in part obvious or in part pointed out hereinafter.

In the accompanying drawings in which is shown one of various possible embodiments of the mechanical features of this invention:

Fig. 1 is a fragmentary plan view of a grinding machine embodying the invention;

Fig. 2 is a fragmentary plan view, on an enlarged scale, of the swivelling mechanism with the parts set for a cylindrical grinding operation;

Fig. 3 is a similar fragmentary plan view, on an enlarged scale, showing the swivel table swivelled for a taper grinding operation;

Fig. 4 is a fragmentary cross sectional view on an enlarged scale, taken approximately on the line 4—4 of Fig. 1 through the nut and screw swivel table adjusting mechanism;

Fig. 5 is an end elevation of the table and swivel table, showing the swivel adjusting mechanism; and Fig. 6 is a fragmentary front elevation, on an enlarged scale, of the swivel adjusting mechanism having parts broken away and shown in section to clarify constructional details.

A grinding machine has been illustrated in the drawings comprising a base 10 which supports a longitudinally reciprocable work table 11. The table 11 is arranged to slide longitudinally relative to the base 10 on a V-way 13 and a flatway 12 formed on the upper surface of the base 10. The table 11 supports a swivel table 14 which is arranged to pivot on a vertically arranged stud 15 carried by the table 11.

A work supporting and rotating mechanism is provided on the swivel table 14 comprising a headstock 16 having a headstock center 17. The swivel table 14 is also provided with a footstock 18 having a footstock center 19. The centers 17 and 19 are arranged to rotatably support the opposite ends of a cylindrical type work piece 20.

The grinding machine is provided with a transversely movable rotatable grinding wheel 21 which is diagrammatically shown in Fig. 1 of the drawings. The supporting slide for the grinding wheel 21 is a conventional feature in a cylindrical grinding machine and consequently has not been illustrated in detail. This mechanism may be substantially the same as that shown in the expired U. S. patent to C. H. Norton No. 762,838 dated June 14, 1904, to which reference may be had for details of disclosure not contained herein.

A swivel table adjusting mechanism is provided for swivelling the swivel table 14 on the pivot stud 15. This mechanism may comprise a rotatable screw 25 (Fig. 4) the left hand end of which is provided with a spherical end portion 26 which meets with a spherically shaped socket 27 formed in a bracket 28 which is clamped on the front edge of the table 11. A clamping screw 29 is provided which passes through a clearance hole in the bracket 28 and is screw threaded into a nut 30 which slides within a T-shaped slot 31 formed in the front surface of the table 11.

A nut 32 meshes with or engages the screw 25. The nut 32 is cylindrical in shape and fits within a cylindrical aperture 33 formed in the swivel table 14. The ball and socket connection between the screw 25 and the bracket 28 together with the rotary support for the nut 32 serves to facilitate a free angular adjustment of the swivel table 14. An aperture 34 is provided in the left hand end face of the spherical end portion 26 of the screw 25 to facilitate imparting a rotary adjusting motion to the screw 25 by means of a suitable wrench. This swivel adjusting mechanism serves to facilitate angularly adjusting the position of the swivel table 14 relative to the longitudinally movable table 11 for taper grinding.

A clamping block 35 is held in position by clamping screws 36 and 37 to facilitate clamping the left hand end of the swivel table 14 relative to the longitudinally movable table 11. A similar clamping block 38 is mounted on the right hand end of the table 11 and is clamped in position thereon by clamping screws 39 and 40 to clamp the right hand end of the swivel table in adjusted position relative to the table 11. The clamping blocks 35 and 38 are substantially L-shaped as shown in Fig. 6, each having an overhanging arm 49 which engages a clamping surface 50 formed on a projecting end of the swivel table 14.

In order to facilitate setting up the machine, the clamping block 38 is provided with a pair of graduated scales comprising a scale 45 which is graduated in inches—taper per foot and a scale 46 which is graduated in degrees of taper. An index pointer 47 is fixedly mounted on the right hand end of the swivel table 14. The index pointer 47 extends over the scales 45 and 46 to facilitate a predetermined swivelling of the table 14. As illustrated in Figs. 1 and 2, the index pointer 47 is positioned over the zero reading on both of the scales 45 and 46 so that the swivel table 14 is positioned for grinding a cylindrical work piece with the axis of the work piece 20 positioned parallel with the table ways 12 and 13. When it is desired to grind a taper on the work piece, the screw 25 may be adjusted after the clamping screws 36—37—39—40 are loosened to unclamp the blocks 35 and 38 so as to swivel the swivel table 14 relative to the longitudinally movable table 11 to the desired extent to grind a predetermined taper on the work piece being ground.

In order to provide a precise angular adjustment of the swivel table 14 relative to the longitudinally movable table 11, a sine bar attachment is provided comprising a bracket 55 which is formed with dovetailed surfaces to mate with dovetailed surfaces 56 formed on the swivel table 14. The bracket 55 may be clamped in adjusted position thereon by means of a clamping block 57. A screw 58 fastened to the bracket 55 passes through a clearance hole in the clamping block 57. A nut 59 carried by the screw 58 serves to facilitate clamping the bracket 55 in the desired adjusted position on the swivel table 14. The bracket 55 serves as a support for a rock arm 60 which is supported by a pair of opposed pivot screws 61 and 62 on a lug 63 formed integral with the bracket 55. The opposed ends of the screws 61 and 62 are conical in shape and mate with conically shaped apertures formed in the upper and lower surface of the boss 63. One arm 64 of the rock arm 60 is provided with a vertically arranged pin 65 which is arranged to engage a locating surface 66 formed on an anvil 67 which is fixedly mounted on the table 11. The rock arm 60 is provided with an arm 70 which is arranged in the path of an actuating plunger 71 of a dial indicator 72. The dial indicator 72 is adjustably supported by an upwardly extending integral lug 73 formed on the upper surface of the bracket 55. The dial indicator 72 may be clamped in adjusted position on the bracket 55 by means of a clamping screw 74.

In setting-up the machine, it is desirable first to position the swivel table in a normal position parallel to the table ways 12—13. In order to position the swivel table into alignment with the table ways, the old and well known method of adjustment may be employed namely, mounting a conventional type dial indicator on the base 10 of the machine with its actuating plunger in engagement with the front edge of the swivel table and then adjusting the swivel table so that a zero reading is obtained on the dial indicator as the longitudinally movable table 11 is traversed longitudinally. When the table has been accurately positioned it may be clamped in this position by tightening the clamping screws 36, 37, 39 and 40 to clamp the opposite ends of the swivel table 14 rigidly into engagement with the longitudinal table 11. In this position of the parts, the mechanism previously described is arranged so that the axis of the pivot stud 15, the axes of the pivot screws 61—62 and the axis of the pin 65 lie in a vertical plane which is parallel to the table ways.

In order to employ the sine bar principle and utilize the well known sine bar tables, it is necessary to provide a hypothenuse which is either 5" long or a multiple of 5 in order that the standard tables may be employed. In the present case a hypothenuse of 40" is provided between the axis of the pivot stud 15 and the axis of the pin 65. In order to precisely position the bracket 55 on the swivel table 14 so that the axis of the pin 65 is exactly 40" from the axis of the pivot stud 15, a pivotally mounted gage member 80 is provided which is pivotally supported on a stud 81 carried by a plate 83 which is fixedly mounted on the right hand end of the table 11. When it is desired to set up the mechanism, the gage arm 80 is swung in a counter-clockwise direction from the position shown in Fig. 3 into the position illustrated in Fig. 2. The pin 65 is in engagement with the locating surface 66 on the anvil 67. In this position of the parts, the bracket 55 is manually moved longitudinally on the swivel table 14 until the pin 65 engages a locating surface 82 formed on the gaging member 80 after which the bracket 55 may be clamped in adjusted position on the swivel table 14 by tightening the nut 59. In this position of the parts the axis of the pin 65 is exactly 40" from the axis of the pivot stud 15. After the bracket 55 has been clamped in adjusted position the gage arm 80 may be swung in a clockwise direction into an inoperative position as shown in Fig. 3. In this position of the parts, the dial gage 72 is adjusted transversely within its supporting boss 74 so that the actuating plunger 71 thereof is in engagement with surface 70a of the arm 70. The bezel 72a of the dial indicator 72 is then rotatably adjusted so that the dial indicator reads zero.

If a work piece 20 is then mounted in position as shown in Fig. 1 with the parts positioned as above described, a true cylindrical work piece will be ground. When it is desired to precisely adjust the swivel table 14 for a taper grinding operation, the swivel table 14 is unclamped by loosening the clamping screws 36, 37, 39 and 40 after which the screw 25 may be rotated to swivel the swivel table 14 in a counter-clockwise direction (Figs. 1 and 2) so that pin 65 moves away from the locating surface 66 on the anvil 67. In order to precisely locate the swivel table 14 relative to the work table 11, a gage block or Jo-block 85 of the proper size is positioned against the locating surface 66 of the anvil 67.

When the swivel table is swivelled in a counterclockwise direction (Figs. 1, 2 and 3) to separate the pin 65 from the locating surface 66, the arm 60 is swung in a clockwise direction by a compression spring 86 until a stop screw 87 carried by the arm 60 engages a stop surface 88 formed on the bracket 55. After a gage block or Jo-block 85 has been inserted in position against the locating surface 66 of the anvil 67, the adjusting screw 25 is manually rotated to swing the swivel table 14 in a clockwise direction to swing the pin 65 into engagement with the Jo-block 85. This counter-clockwise movement of the swivel table 14 is continued and the arm 60 swings in a counter-clockwise direction against the compression of the spring 86 until the dial indicator 72 reads zero to precisely position the swivel table 14 in the desired angular position for grinding a predetermined taper on a work piece 20.

In order to precisely position the swivel table 14, the sine-bar principle is employed in which the 40" distance between the pivot stud 15 and the pin 65 is the hypothenuse of a right angle triangle. In order to produce a predetermined taper adjustment it is necessary to determine the "H" value, that is, the thickness of the Jo-block 85 to be utilized thereby determining the distance between the periphery of the pin 65 and the locating surface 66 which forms a short side of the right angle triangle. If it is desired to produce a 7°–30' taper, the conventional 5" sine-bar table is consulted which gives a reading of 0.65265. Since in the present case a 40" sine-bar arrangement is utilized, the figure 0.65265 is multiplied by 8 giving a result of 5.2212 inches. Gage blocks or Jo-blocks 85 are then assembled to give an overall total of 5.2212 inches which are then positioned on the plate 83 in engagement with the locating surface 66 of the anvil 67 after which the swivel adjusting screw 25 is rotated to cause a clockwise swivelling movement of the swivel table 14. During this movement the pin 65 moves into engagement with the Jo-block 85 assembly. This movement continues until the arm 60 swings in a counter-clockwise direction until the dial indicator 72 reads zero after which the clamping screws 36, 37, 39 and 40 are tightened to tighten the clamping blocks 35 and 38 thereby clamping the swivel table 14 in adjusted position on the longitudinally movable table 11 so as to position the axis of the work piece being ground so that a 7°–30' taper will be produced on the periphery thereof.

If it is desired to grind predetermined tapers based on diameter taper per foot, a table may be worked out to establish the height of gage blocks to be used for producing a predetermined taper.

The operation of this improved swivel adjusting mechanism will be readily apparent from the foregoing disclosure. In order to set up the machine for grinding a work piece to a predetermined taper, either a taper in degrees on a side or a taper in inches on diameter per foot is calculated in the manner above described to determine the height of the Jo-blocks 85 to be used after which the swivel table is swivelled to position the swivel table for grinding the desired and predetermined taper. The swivel table 14 may be swivelled by actuation of the screw 25 into approximately the desired angular position by use of the graduated scales 45 and 46, after which a continued adjustment of the screw 25 is made until the dial indicator reads zero. The swivel table 14 may be then clamped in adjusted position by tightening the clamping screws 36, 37, 39 and 40.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinabove set forth or shown in the accompanying drawings is to be interpreted as illustrative and not in a limiting sense.

I claim:

1. In a machine tool having a base, a longitudinally movable table thereon, a swivel table on said longitudinally movable table, a fixed pivot stud which mates with an aperture in said swivel table, means including a nut and screw mechanism spaced from said pivot stud operatively connected to effect a swivelling adjustment of said swivel table, and a sine-bar attachment including a bracket adjustably clamped on said swivel table, a rock arm pivotally mounted on said bracket, a dial indicator adjustably mounted on said bracket having its actuating plunger arranged to engage one end of said rock arm, a vertical pin on the other end of said rock arm, a fixed locating surface which is engaged by said pin, and means precisely to position said bracket relative to said swivel table when said pin is in engagement with said surface to facilitate locating said pin in a predetermined distance from the axis of said pivot stud.

2. In a machine tool as claimed in claim 1, in combination with the parts and features therein specified of a fixed anvil on said longitudinally movable table, and a locating surface on said anvil positioned in the path of movement of said pin, said parts being adjusted and arranged so the dial indicator reads zero when the pin is in engagement with said locating surface and a gage block inserted between said locating surface and said pin to position said swivel table in a predetermined angular position for a taper operation.

3. In a machine tool having a base, a longitudinally movable table thereon, a swivel table on said longitudinally movable table, a fixed pivot stud which mates with an aperture in said swivel table, means including a manually operable nut and screw mechanism spaced from said pivot stud operatively connected to effect a swivelling adjustment of said swivel table, a sine-bar attachment including a bracket adjustably clamped on said swivel table, a rock arm, a pivot stud for said arm which is fixedly mounted on said bracket, a dial indicator adjustably mounted on said bracket having its actuating plunger arranged to engage the one end of said rock arm, a vertical pin on the other end of said rock arm, the axes of said pivot studs and said pin being arranged in the same vertical plane, and means including a gage to facilitate adjusting said bracket relative to said table to position said pin in a predetermined distance from the axis of said pivot stud to provide a hypothenuse of a predetermined length to facilitate precise swivel adjustment of said swivel table.

4. In a machine tool having a base, a longitudinally movable table thereon, a swivel table on said longitudinally movable table, a fixed pivot stud which mates with an aperture in said swivel table, means including a manually operable nut and screw mechanism spaced from said pivot stud operatively connected to effect a swivelling adjustment of said swivel table, a sine-bar attachment including a bracket adjustably clamped on said swivel table, a rock arm pivotally mounted on said bracket, a vertical pin on the end of said rock arm, a dial indicator adjustably mounted on said bracket having its actuating plunger arranged to engage the one end of said rock arm, a fixed locating surface which is engaged by said pin, a vertical pin on the other end of said rock arm, and means including a pivotally mounted gage which is movable to and from an operative position to facilitate positioning said bracket on the swivel table so that the pin is located a predetermined distance from the axis of said pivot stud to provide a hypothenuse of a predetermined length to facilitate precise swivel adjustment of said swivel table.

5. In a grinding machine having a base, a rotatable grinding wheel thereon, a longitudinally movable work table of the said base, a swivel table on said work table, a vertical pivot stud located substantially midway on said work table which mates with an aperture in said swivel table, a rotatable work support including a headstock and a footstock center on said swivel table, means including a manually operable nut and screw mechanism operatively connected between the table and swivel table adjacent to one end thereof, and a sine-bar attachment including a bracket adjustably clamped on said swivel table, a rock arm pivotally mounted on said bracket, a dial indicator adjustably mounted on said bracket having its actuating plunger arranged in the path of one end of said rock arm, a vertical pin on the other end of said rock arm, a locating surface fixedly mounted on said longitudinally movable table, and means precisely to position said bracket so that said pin is located a predetermined distance from the axis of said pivot stud.

6. In a grinding machine as claimed in claim 5, in combination with the parts and features therein specified of a gage block of a predetermined height for producing a predetermined taper positioned against said locating surface, said nut and screw mechanism serving to swivel said swivel table to swing said pin into engagement with the gage block, said swivelling movement being continued until the dial indicator reads zero to facilitate positioning the swivel table in a predetermined angular relationship to said longitudinally movable table.

7. In a grinding machine, as claimed in claim 5, in combination with the parts and features therein specified of an anvil supported on said longitudinally movable table and having a locating surface thereon for positioning a gage block and means to swivel said swivel table so that the pin moves into engagement with said gage block and continues until the dial indicator reads zero to facilitate positioning the swivel table in a predetermined angular position for grinding a predetermined taper on a work piece.

References Cited in the file of this patent

UNITED STATES PATENTS

| 1,693,723 | Mitchell | Dec. 4, 1928 |
| 2,429,517 | Knapp | Oct. 21, 1947 |
| 2,600,550 | Levesque | June 17, 1952 |
| 2,645,067 | Hinderer | July 14, 1953 |
| 2,702,970 | Haverstick | Mar. 1, 1955 |